US011447374B2

United States Patent
Elvery

(10) Patent No.: US 11,447,374 B2
(45) Date of Patent: Sep. 20, 2022

(54) CRANE COUNTERWEIGHT AND SUSPENSION

(71) Applicant: TEREX AUSTRALIA PTY LTD, Queensland (AU)

(72) Inventor: Dallas Elvery, Queensland (AU)

(73) Assignee: TEREX AUSTRALIA PTY LTD, Eagle Farm (AU)

( * ) Notice: Subject to any disclaimer, the term of this patent is extended or adjusted under 35 U.S.C. 154(b) by 0 days.

(21) Appl. No.: 16/890,464

(22) Filed: Jun. 2, 2020

(65) Prior Publication Data

US 2020/0290847 A1    Sep. 17, 2020

Related U.S. Application Data

(62) Division of application No. 16/333,720, filed as application No. PCT/AU2017/050999 on Sep. 14, 2017, now Pat. No. 10,710,849.

(30) Foreign Application Priority Data

Sep. 15, 2016 (AU) ................. 2016903705

(51) Int. Cl.
*B66C 23/72* (2006.01)
*B60G 17/005* (2006.01)
(Continued)

(52) U.S. Cl.
CPC ............ *B66C 23/72* (2013.01); *B60G 17/005* (2013.01); *B62D 53/02* (2013.01); *B62D 61/125* (2013.01);
(Continued)

(58) Field of Classification Search
CPC .. B62D 61/12; B62D 61/125; B60G 2204/47; B60G 2300/06; B60G 2400/61; B66C 23/26
(Continued)

(56) References Cited

U.S. PATENT DOCUMENTS 1,828,905 A    10/1931  Mossay
3,097,719 A     7/1963  Rood
(Continued)

FOREIGN PATENT DOCUMENTS

AT    324849 B  *  9/1975  ............. B62D 61/12
AT    386814 B     10/1988
(Continued)

OTHER PUBLICATIONS

International Search Report issued in PCT/AU2017/050999 dated Nov. 20, 2017.
(Continued)

*Primary Examiner* — James A English
(74) *Attorney, Agent, or Firm* — Brooks Kushman P.C.

(57) ABSTRACT

Disclosed is a mobile articulated crane having a boom for carrying a load when the crane is stationary and while the crane is mobile. The boom has an end for engaging with a load and an opposed end. The crane further comprises a counterweight attached to the boom at or close to the opposed end of the boom. A rear body of the crane can comprise first and second rear axles, each for supporting the rear body on the ground. The first rear axle can be arranged to be displaced relative to the second rear axle such that wheels of the first rear axle selectively engage or disengage with the ground.

14 Claims, 8 Drawing Sheets

(51) Int. Cl.
  *B66C 23/62* (2006.01)
  *B62D 61/12* (2006.01)
  *B62D 53/02* (2006.01)

(52) U.S. Cl.
  CPC .......... *B66C 23/62* (2013.01); *B60G 2204/47* (2013.01); *B60G 2300/06* (2013.01); *B60G 2400/61* (2013.01)

(58) Field of Classification Search
  USPC ................. 212/301, 302; 180/209; 280/86.5
  See application file for complete search history.

(56) References Cited

U.S. PATENT DOCUMENTS

| | | | |
|---|---|---|---|
| 3,123,222 A | 3/1964 | Livingston et al. | |
| 3,130,806 A | 4/1964 | Baer et al. | |
| 3,237,781 A | 3/1966 | Heigl | |
| 3,260,325 A | 7/1966 | Brown et al. | |
| 3,422,919 A | 1/1969 | Molby et al. | |
| 3,515,235 A | 6/1970 | Kamner | |
| 3,784,035 A * | 1/1974 | Dunbar | B60P 1/5433 414/543 |
| 3,795,285 A | 3/1974 | Scholl et al. | |
| 3,800,903 A | 4/1974 | Beals et al. | |
| 3,866,705 A | 2/1975 | Anderson et al. | |
| 3,929,199 A | 12/1975 | Warren | |
| 3,952,825 A | 4/1976 | Beyers | |
| 3,991,847 A | 11/1976 | Unruh | |
| 4,043,422 A | 8/1977 | Barrett et al. | |
| 4,071,108 A | 1/1978 | Iida | |
| 4,081,054 A | 3/1978 | Yates | |
| 4,081,961 A | 4/1978 | Dwyer | |
| 4,117,905 A | 10/1978 | Mustered | |
| 4,344,640 A | 8/1982 | Ratsko et al. | |
| 4,365,685 A | 12/1982 | Ratsko et al. | |
| 4,390,314 A | 6/1983 | Oberg | |
| 4,431,363 A | 2/1984 | Waite | |
| 4,494,765 A | 1/1985 | Ratsko et al. | |
| 4,506,792 A * | 3/1985 | Hedlund | B62D 53/021 212/223 |
| 4,565,257 A | 1/1986 | Hanson | |
| 4,572,311 A * | 2/1986 | Oswald | B60K 7/0007 180/24.05 |
| 4,583,756 A | 4/1986 | Hornung et al. | |
| 4,616,841 A | 10/1986 | Reichl et al. | |
| 4,639,008 A | 1/1987 | Krettenauer et al. | |
| 4,688,818 A | 8/1987 | Grassmuck | |
| 4,723,667 A * | 2/1988 | Zimmerman | B66C 23/78 212/302 |
| 4,734,006 A | 3/1988 | Krob et al. | |
| 4,771,851 A | 9/1988 | Nystuen et al. | |
| 4,802,545 A | 2/1989 | Nystuen et al. | |
| 4,848,499 A | 7/1989 | Martinet et al. | |
| 4,940,106 A | 7/1990 | Pedersen et al. | |
| 5,035,295 A | 7/1991 | Leiber et al. | |
| 5,171,035 A | 12/1992 | Brown | |
| 5,193,637 A | 3/1993 | Lindblom | |
| 5,234,069 A | 8/1993 | Krone et al. | |
| 5,269,389 A | 12/1993 | Tomiyoshi et al. | |
| 5,308,216 A * | 5/1994 | Herolf | A01G 23/006 180/209 |
| 5,332,052 A * | 7/1994 | Carnevale | B60K 5/10 180/14.2 |
| 5,489,005 A | 2/1996 | Marcott et al. | |
| 5,522,139 A | 6/1996 | Rossato | |
| 5,536,030 A | 7/1996 | Bettini | |
| 5,579,863 A | 12/1996 | Nelson et al. | |
| 5,732,789 A | 3/1998 | Stephenson | |
| 5,743,149 A | 4/1998 | Cullity | |
| 5,908,081 A | 6/1999 | Olson | |
| 6,016,885 A | 1/2000 | Hickman et al. | |
| 6,039,133 A | 3/2000 | Zulu | |
| H1846 H | 4/2000 | Poorman | |
| 6,116,362 A | 9/2000 | Schubert et al. | |
| 6,158,544 A | 12/2000 | Dvorak et al. | |
| 6,170,848 B1 | 1/2001 | Wechner | |
| 6,266,596 B1 | 7/2001 | Hartman et al. | |
| 6,283,237 B1 | 9/2001 | Muller | |
| 6,494,476 B2 | 12/2002 | Masters et al. | |
| 6,581,718 B1 | 6/2003 | Vigren et al. | |
| 6,595,314 B2 | 7/2003 | Juul et al. | |
| 6,631,817 B1 * | 10/2003 | Fleagle | A61P 9/00 212/301 |
| 6,668,967 B2 | 12/2003 | Sorensen et al. | |
| 6,675,848 B2 * | 1/2004 | Chai | A01G 23/08 144/335 |
| 6,684,975 B2 | 2/2004 | Rudolph | |
| 6,857,494 B2 | 2/2005 | Kobayashi et al. | |
| 6,883,821 B2 | 4/2005 | Gunderson | |
| 6,923,453 B2 * | 8/2005 | Pivac | B60G 17/005 280/280 |
| 6,926,113 B2 | 8/2005 | Hennemann et al. | |
| 6,932,373 B2 | 8/2005 | Seebohm et al. | |
| 7,389,847 B2 | 6/2008 | Sakikawa | |
| 7,412,315 B2 | 8/2008 | Wildey et al. | |
| 7,597,168 B2 | 10/2009 | Anderson et al. | |
| 7,624,836 B2 | 12/2009 | Huang et al. | |
| 7,634,909 B1 | 12/2009 | Chatterjea | |
| 7,721,842 B2 | 5/2010 | Forero | |
| 7,904,222 B2 | 3/2011 | Lee et al. | |
| 8,002,074 B2 | 8/2011 | Roose | |
| 8,069,942 B2 | 12/2011 | Niva | |
| 8,087,489 B2 | 1/2012 | Tanaka et al. | |
| 8,128,107 B2 * | 3/2012 | Koenigstein | B60G 9/02 280/86.5 |
| 8,276,704 B2 | 10/2012 | Landoll et al. | |
| 8,435,104 B2 | 5/2013 | Dillon | |
| 8,448,741 B2 | 5/2013 | Breiner et al. | |
| 8,469,125 B2 | 6/2013 | Yu et al. | |
| 8,534,415 B2 | 9/2013 | Roose | |
| 8,548,680 B2 | 10/2013 | Ryerson et al. | |
| 8,627,917 B2 | 1/2014 | Kodera et al. | |
| 8,684,125 B2 | 4/2014 | Niva | |
| 8,727,059 B2 | 5/2014 | Anliker et al. | |
| 8,807,261 B2 | 8/2014 | Subrt et al. | |
| 8,863,882 B2 | 10/2014 | Landoll et al. | |
| 9,051,007 B2 | 6/2015 | Orgeron | |
| 9,051,711 B2 | 6/2015 | Sharma et al. | |
| 9,103,098 B2 | 8/2015 | Zhu | |
| 9,108,674 B2 | 8/2015 | Thorén et al. | |
| 9,126,626 B1 | 9/2015 | Dieleman et al. | |
| 9,234,331 B1 | 1/2016 | Sharma et al. | |
| 9,267,245 B1 | 2/2016 | Braun | |
| 9,290,910 B2 | 3/2016 | Sharma et al. | |
| 9,428,884 B2 | 8/2016 | Sharma et al. | |
| 9,586,798 B2 | 3/2017 | McVicar et al. | |
| 9,643,670 B2 * | 5/2017 | Pohjoisaho | B62D 53/04 |
| 9,815,492 B2 | 11/2017 | Boos | |
| 9,862,413 B2 | 1/2018 | Laine | |
| 9,878,740 B2 | 1/2018 | Yang et al. | |
| 9,926,005 B2 | 3/2018 | Wiktor et al. | |
| 9,981,689 B2 | 5/2018 | Sandford | |
| 10,035,540 B2 | 7/2018 | Yang et al. | |
| 10,040,476 B2 | 8/2018 | Ge | |
| 10,087,603 B2 | 10/2018 | Mitchell et al. | |
| 10,118,656 B2 | 11/2018 | Szalko et al. | |
| 10,336,368 B2 | 7/2019 | Wagner et al. | |
| 10,710,849 B2 * | 7/2020 | Elvery | B62D 53/02 |
| 2001/0018991 A1 | 9/2001 | Venturi et al. | |
| 2002/0011060 A1 | 1/2002 | Dillon | |
| 2002/0180178 A1 | 12/2002 | Masters et al. | |
| 2005/0121878 A1 | 6/2005 | Muldoon | |
| 2007/0126196 A1 * | 6/2007 | Klahn | B60P 3/40 280/86.5 |
| 2007/0246288 A1 | 10/2007 | Mather et al. | |
| 2007/0296173 A1 * | 12/2007 | Regnell | G01G 19/08 280/124.1 |
| 2008/0224444 A1 | 9/2008 | Atley | |
| 2010/0137044 A1 | 6/2010 | Dillon | |
| 2010/0206648 A1 * | 8/2010 | Kelppe | B62D 55/04 180/9.1 |
| 2017/0036894 A1 | 2/2017 | Braun et al. | |
| 2018/0099660 A1 | 4/2018 | Weigert et al. | |

(56) References Cited

U.S. PATENT DOCUMENTS

| | | | |
|---|---|---|---|
| 2018/0215411 A1 | 8/2018 | Riot et al. | |
| 2019/0061813 A1 | 2/2019 | Riot et al. | |
| 2019/0071119 A1 | 3/2019 | Takenaka et al. | |

FOREIGN PATENT DOCUMENTS

| | | | | |
|---|---|---|---|---|
| AT | 387191 B | 12/1988 | | |
| AT | 388537 B | 7/1989 | | |
| AU | 198289180 A | 4/1983 | | |
| AU | 580947 B2 | 2/1989 | | |
| AU | 2012203625 A1 | 8/2012 | | |
| BE | 887425 A | 6/1981 | | |
| CA | 2991113 A1 * | 1/2017 | ............. | B62D 55/30 |
| CN | 201354098 Y | 12/2009 | | |
| CN | 201895696 U | 7/2011 | | |
| CN | 102381355 A | 3/2012 | | |
| CN | 202272052 U | 6/2012 | | |
| CN | 202357865 U | 8/2012 | | |
| CN | 203005522 U | 6/2013 | | |
| CN | 203064027 U | 7/2013 | | |
| CN | 204452588 U | 7/2015 | | |
| CN | 103395445 B | 8/2015 | | |
| CN | 105235744 A | 1/2016 | | |
| CN | 103448798 B | 6/2016 | | |
| CN | 105620549 A | 6/2016 | | |
| CN | 205686467 U | 11/2016 | | |
| CN | 205872179 U | 1/2017 | | |
| CN | 205890980 U | 1/2017 | | |
| CN | 106515851 A | 3/2017 | | |
| CN | 104527785 B | 4/2017 | | |
| CN | 206231449 U | 6/2017 | | |
| CN | 206265138 U | 6/2017 | | |
| CN | 105857393 B | 11/2017 | | |
| CN | 206633737 U | 11/2017 | | |
| CN | 107628134 A | 1/2018 | | |
| CN | 206984108 U | 2/2018 | | |
| CN | 104108420 B | 5/2018 | | |
| CN | 106080773 B | 6/2018 | | |
| CN | 106240634 B | 7/2018 | | |
| CN | 108263471 A | 7/2018 | | |
| CN | 105711644 B | 10/2018 | | |
| CN | 106218719 B | 1/2019 | | |
| DE | 2547487 A1 | 4/1977 | | |
| DE | 1430724 B2 | 7/1977 | | |
| DE | 1814794 B2 | 8/1978 | | |
| DE | 2725357 A1 * | 12/1978 | ............. | E02F 9/003 |
| DE | 1901588 B2 | 6/1979 | | |
| DE | 2820111 A1 | 11/1979 | | |
| DE | 2116077 B2 | 4/1980 | | |
| DE | 2903624 A1 | 8/1980 | | |
| DE | 2909970 A1 | 9/1980 | | |
| DE | 2911098 A1 | 9/1980 | | |
| DE | 3127547 A1 | 2/1983 | | |
| DE | 3305759 A1 | 8/1984 | | |
| DE | 3309119 A1 | 9/1984 | | |
| DE | 3442030 A1 | 6/1985 | | |
| DE | 3522566 A1 | 1/1986 | | |
| DE | 3543054 A1 | 6/1986 | | |
| DE | 3616457 C1 | 11/1987 | | |
| DE | 3623347 A1 | 2/1988 | | |
| DE | 3546704 C2 * | 7/1991 | ........... | B60G 17/005 |
| DE | 4119014 A1 * | 12/1992 | ............. | B62D 13/02 |
| DE | 4137382 C1 | 4/1993 | | |
| DE | 4231599 A1 | 3/1994 | | |
| DE | 4442488 A1 * | 5/1996 | ............. | B62D 61/00 |
| DE | 29608229 U1 | 8/1996 | | |
| DE | 19526702 A1 | 2/1997 | | |
| DE | 102006037588 A1 | 2/2008 | | |
| DE | 202009005446 U1 | 9/2010 | | |
| DE | 102010018386 A1 | 10/2011 | | |
| DE | 102016102854 A1 | 8/2017 | | |
| DE | 102016106459 A1 | 10/2017 | | |
| DE | 102017011298 A1 | 6/2018 | | |
| EP | 0011881 B1 | 7/1982 | | |
| EP | 0253725 B1 | 12/1990 | | |
| EP | 0266785 B1 | 4/1991 | | |
| EP | 0536432 B1 | 3/1997 | | |
| EP | 0905006 A2 | 3/1999 | | |
| EP | 0911246 A2 | 4/1999 | | |
| EP | 1418115 A1 | 5/2004 | | |
| EP | 1847442 A2 | 10/2007 | | |
| EP | 1847443 A2 | 10/2007 | | |
| EP | 1164074 B1 | 8/2008 | | |
| EP | 1336549 B1 | 3/2009 | | |
| EP | 2145813 B1 | 4/2012 | | |
| EP | 2479086 A2 | 7/2012 | | |
| EP | 2218835 B1 | 10/2012 | | |
| EP | 1366970 B1 | 1/2013 | | |
| EP | 2404808 B1 | 7/2014 | | |
| EP | 2634071 B1 | 1/2015 | | |
| EP | 2923862 B1 | 4/2019 | | |
| FR | 1350020 A * | 1/1964 | ........... | B62D 61/125 |
| FR | 2877062 A1 | 4/2006 | | |
| GB | 919536 A | 2/1963 | | |
| GB | 959549 A | 6/1964 | | |
| GB | 1459263 A | 12/1976 | | |
| GB | 2 042 997 A | 10/1980 | | |
| GB | 2 069 428 A | 8/1981 | | |
| GB | 2 139 577 A | 11/1984 | | |
| GB | 2117725 B | 9/1985 | | |
| GB | 2 161 434 A | 1/1986 | | |
| GB | 2249289 A | 5/1992 | | |
| GB | 2374329 B | 7/2004 | | |
| GB | 2495940 B | 6/2018 | | |
| JP | S57191706 A | 11/1982 | | |
| JP | 6385910 B2 | 9/2018 | | |
| KR | 100885892 B1 | 2/2009 | | |
| KR | 100885893 B1 | 2/2009 | | |
| KR | 101009325 B1 | 1/2011 | | |
| SE | 1630044 A1 | 9/2017 | | |
| SE | 1650936 A1 | 12/2017 | | |
| SU | 586027 A1 | 12/1977 | | |
| SU | 765083 A2 | 9/1980 | | |
| SU | 867756 A1 | 9/1981 | | |
| SU | 1044534 A1 | 9/1983 | | |
| SU | 1049322 A1 | 10/1983 | | |
| SU | 1094790 A1 | 5/1984 | | |
| SU | 1234269 A1 | 5/1986 | | |
| SU | 1475850 A1 | 4/1989 | | |
| SU | 1544627 A1 | 2/1990 | | |
| SU | 1749100 A1 | 7/1992 | | |
| WO | 85/03263 A1 | 8/1985 | | |
| WO | 91/09765 A1 | 7/1991 | | |
| WO | 00/71405 A1 | 11/2000 | | |
| WO | 01/45997 A1 | 6/2001 | | |
| WO | 2005/100133 A1 | 10/2005 | | |
| WO | 2008/148635 A1 | 12/2008 | | |
| WO | 2010/141962 A1 | 12/2010 | | |
| WO | 2011/033189 A1 | 3/2011 | | |
| WO | 2012/044238 A1 | 4/2012 | | |
| WO | 2014138801 A1 | 9/2014 | | |
| WO | 2015/156708 A1 | 10/2015 | | |
| WO | 2015162096 A1 | 10/2015 | | |
| WO | 2016/058595 A1 | 4/2016 | | |
| WO | WO 2017/007394 A1 * | 1/2017 | | |
| WO | 2018/072647 A1 | 4/2018 | | |
| WO | 2018/072648 A1 | 4/2018 | | |
| WO | 2018/166680 A1 | 9/2018 | | |
| WO | 2019/037870 A1 | 2/2019 | | |
| WO | 2019/038426 A1 | 2/2019 | | |
| WO | 2019/106130 A1 | 6/2019 | | |
| WO | 2019/110094 A1 | 6/2019 | | |
| WO | 20191/04436 A1 | 6/2019 | | |

OTHER PUBLICATIONS

Notification of Transmittal of International Preliminary Report on Patentability issued in International Application No. PCT/AU2017/050999 dated Aug. 21, 2018.

(56) References Cited

OTHER PUBLICATIONS

Written Opinion of the International Searching Authority issued in International Application No. PCT/AU2017/050999 dated Nov. 20, 2017.

* cited by examiner

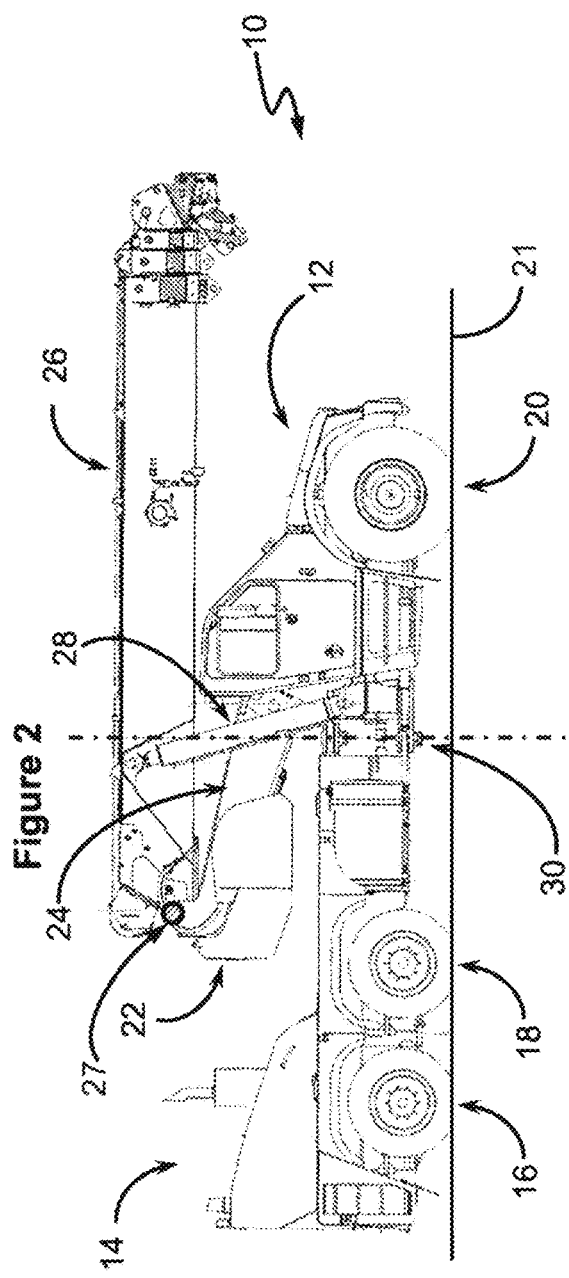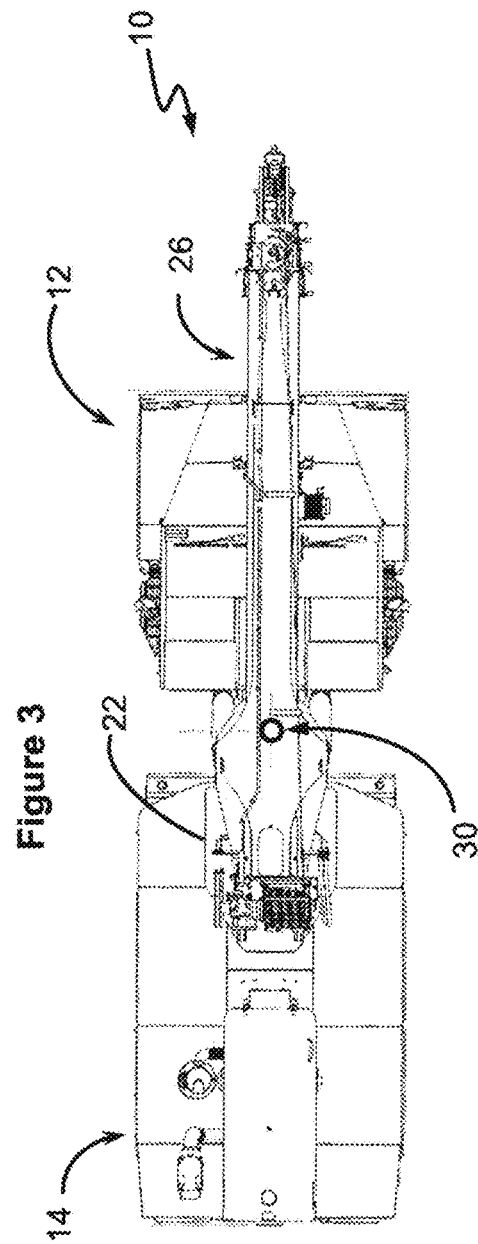

CRANE COUNTERWEIGHT AND SUSPENSION

RELATED APPLICATION DATA

This application is a division of U.S. patent application Ser. No. 16/333,720, filed Mar. 15, 2019, the entirety of which is incorporated herein by reference to the extent permitted by law. U.S. patent application Ser. No. 16/333,720 is the Section 371 National Stage of PCT/AU2017/050999 filed Sep. 14, 2017. This application claims the benefit of priority to Australian Patent Application No. 2016903705 filed Sep. 15, 2016, the entirety of which is incorporated by reference herein to the extent permitted by law.

TECHNICAL FIELD

This disclosure generally relates to pick and carry cranes and, more particularly, to improved counterweight and suspension systems for pick and carry cranes.

BACKGROUND ART

A pick and carry crane is a type of crane that is able to move (i.e. travel) while it has a load suspended from a boom of the crane. Some pick and carry cranes are able to drive on public roads at highway speeds, with these cranes being classified as special purpose vehicles. The design of pick and carry cranes can vary depending on the application of the crane. Some designs of pick and carry cranes are more maneuverable compared to other crane types. For example, when the pick and carry crane is articulated, the whole crane can fit within a turning circle of the crane. This design feature can enable articulated pick and carry cranes to be used in tight or confined spaces to lift and move loads, such as on the floor of a manufacturing facility.

Pick and carry cranes can also take the form of "taxi cranes", which is a reference to the crane travelling with all equipment required to operate through the full range of capability of the crane. In some taxi cranes, the same operator station is used to control the crane when travelling (such as on a public road) as when operating the crane at a facility. This "single cabin" arrangement helps to simplify crane configuration, and also provides flexibility for the operator (i.e. by not having to move back and forth between a driver's cab and a crane cab). Many cranes cannot operate as a taxi crane since they cannot transport all components required to operate, hence support vehicles are generally required to carry extra components, such as counterweights and rigging including slings & hooks.

As the maximum rated capacity (MRC) of the crane increases, its weight generally increases. Pick and carry cranes tend to carry lighter loads in comparison to other cranes (i.e. less than 25 tonnes). However, the increased maneuverability of pick and carry cranes has led to a demand for pick and carry cranes that are able to carry more than or that have an MRC greater than 25 tonnes, whilst also being able to lift and carry such larger loads in confined or tight spaces.

However, as the rated capacity of a pick and carry crane increases, its susceptibility to sideways tipping generally also increases. The increase in susceptibility to sideways tipping comes about since there are physical limitations to the overall width of a pick and carry crane when e.g. driving on public roads such as highways or when driving in a facility. Crane tipping and thus crane toppling presents occupational as well as public health and safety issues.

With mobile cranes, for example, outriggers can be used to minimise susceptibility to sideways tipping. However, such outriggers are used when the crane is operating at a stationary position. Because pick and carry cranes need to travel with a load, this means that outriggers typically cannot be used.

It is to be understood that references herein to the prior art do not constitute an admission that such art forms a part of the common general knowledge of a person of ordinary skill in the art, in Australia or any other country.

SUMMARY OF THE DISCLOSURE

Disclosed herein is an improved pick and carry crane. The pick and carry crane comprises a front body that defines a front part of the crane. The front body is pivotally connected via a pivot arrangement to a rear body of the crane. This arrangement defines the crane as an articulated pick and carry crane.

The pick and carry crane defines a side tipping line when the front body has been pivoted (i.e. articulated) relative to the rear body about the pivot arrangement. The side tipping line is defined as an imaginary longitudinal axis that extends between a point at which the front body contacts the ground to a point at which the rear body contacts the ground, being the points about which the crane may topple (e.g. when under load and in use). A maximum amount of the load can be transferred through these front and rear points at the point of tipping. Typically the point at which the front body contacts the ground is via inner tyre(s) of the front body (i.e. when articulated). Typically the point at which the rear body contacts the ground is via inner tyre(s) of the rear body (i.e. again, when articulated).

In accordance with the disclosure, a first counterweight is mounted with respect to the crane and is arranged to move with respect to the side tipping line so as to maintain a counteracting side tipping moment above a threshold value when the crane is lifting and/or carrying a load. This threshold value corresponds to a side tipping moment that would cause the crane to topple sideways about the tipping line.

Such a pick and carry crane may carry greater loads whilst, at the same time, having a reduced susceptibility to sideways tipping, such as when compared to currently known pick and carry cranes.

It has been observed that the position of the centre of mass/gravity in relation to the tipping line can represent a critical relationship in relation to crane stability. For example, it is known that the length of pick and carry cranes has generally increased (i.e. to provide a greater distance from the centre of mass/gravity to a so-called forward tipping line—end-to-end tipping). This increased length enables the crane to accommodate (i.e. lift and carry) larger loads.

However, because of the physical constraints on width imposed by public road use, the increase in pick and carry crane length has occurred without a commensurate increase in crane width (distance from crane centre of gravity to the side tipping line). For example, in the past, the original lower capacity pick and carry cranes tended to be wider than they really needed to be, whereas later-developed higher capacity cranes approached a design criterion where they were narrower than was optimal.

It has also been observed that, as the difference between forward tipping stability and side tipping stability increases, the rated capacity of a pick and carry crane can change rapidly with small changes in angle of the boom. For example, the driving of the crane onto sloping or uneven ground can create a sudden reduction in capacity, with small changes in the roll angle of the crane likely to increase likelihood of tipping. In addition, the crane can become too sensitive to small load swings.

Since pick and carry cranes are designed to be driven on public roads, which allows them to quickly and easily drive between sites of operation, as well as to quickly set up to lift and carry loads, their overall width is limited. In this regard, to be able to drive on public roads, the crane must have a size that meets various road and safety regulations. For example, such regulations specify that the width of a crane generally needs to be less than 3000 mm. In an embodiment, the width of crane is greater than 2500 mm, and may be 2600 mm, 2700 mm, 2750 mm. More specifically, the width of crane may be about 2740 mm.

Given the width of the crane cannot be increased indefinitely, any counteracting side tipping moment cannot also be increased simply by continuing to increase the width of the crane. Therefore, the present inventors have conceived of the idea of a first counterweight that is moveable relative to the side tipping line to increase the counteracting side tipping moment of a pick and carry crane. The first counterweight may improve the counteracting side tipping moment by at least 25% compared to pick and carry cranes that do not have the first counterweight.

In an embodiment, the crane may further comprise a boom support arm for supporting a boom of the crane. The boom support arm can be arranged at one end of the front body.

In an embodiment, the first counterweight may be mounted to an opposite end of the boom support arm, so as to be located rearwardly of the pivot arrangement. Thus, when the crane articulates, the first counterweight may move, relative to the side tipping line, with the boom support arm.

In an alternative embodiment, the crane may further comprise a moveable frame that is mounted to the crane for movement with respect to the side tipping line. The first counterweight may be mounted to the moveable frame such that it can be moved laterally therefrom so as to maintain the counteracting side tipping moment above the threshold value.

The rear body may also be configured to act as a counterweight. In an embodiment, the crane may further comprise a second counterweight that can be mounted with respect to the rear body of the crane. The second counterweight may be mounted to one of:
a. a rearward end of the rear body of the crane;
b. a moveable frame that is mounted with respect to the rear body of the crane, the mounting to the moveable frame being such that the second counterweight can be located at the rearward end of the rear body of the crane or be moved laterally therefrom.

The second counterweight can provide counteracting end-to-end tipping moment of a pick and carry crane. The second counterweight can also act cooperatively with the first counterweight.

As set forth above, mobile cranes are generally rated according to their Maximum Rated Capacity (MRC). For example, in Australia it is a requirement that the MRC be displayed on the crane. The MRC is the highest rated capacity (RC) value that a crane can lift. In most cases there will be a very limited range of configurations in which the MRC will be achieved, and a lesser RC will exist for all other configurations. Hence a crane referred to as a "20 tonne" crane has a MRC of 20 tonne.

However the RC of a crane is based on a combination of the stability load moment capacity of the crane as well as the strength limit of all components of the crane. For example, two pick and carry cranes may have a 25 MRC, where a first crane can lift 25 tonne at a 1.0 metre radius, and the second crane can lift 25 tonne at a 1.4 metre radius. The two cranes have the same MRC but the second crane has a higher load moment capacity. Hence, at any other radius, such as say 3.0 metre, the second crane has a much higher RC because of its higher load moment capacity.

Therefore, in practice it is load moment capacity that denotes the usefulness of a crane. The stability load moment capacity of a crane is derived from two variables; the total mass (referred to generally as the weight) of the crane and the distance from the centre of gravity (CG) of the crane mass to the tipping line, where:

Load Moment=(crane mass)×(radius of CG to tipping line).

For example, if a crane has load moment capacity of 30 tonne metre, then at a radius of 3 metres, it will safely lift 10 tonne, and at radius of 5 m it will safely lift 6 tonne.

A pick and carry crane using the first counterweight as disclosed herein may have a MRC and load moment capacity that can exceed existing pick and carry cranes (i.e. that do not employ such a first counterweight). In an embodiment, the MRC of the pick and carry crane as disclosed herein may be 40 tonne (t). In an embodiment, the load moment of the pick and carry crane as disclosed herein may be 66 tonne meters (t.m). However, these values are indicative, and should not be interpreted as representing upper limits.

Also disclosed herein is a further improved pick and carry crane. The pick and carry crane comprises a front body that defines a front part of the crane. The front body is pivotally connected via a pivot arrangement to a rear body of the crane. This arrangement again defines the crane as an articulated pick and carry crane.

The front body comprises a front axle for supporting the front body on the ground. The rear body comprises first and second rear axles, each for supporting the rear body on the ground.

In accordance with the disclosure, the first rear axle is arranged to be displaced relative to the second rear axle such that wheels of either the first rear axle or the second rear axle can selectively engage or disengage with the ground.

To increase the counteracting forward tipping moment, the weight of the rear body can be increased. However, simply increasing the weight of the rear body can cause the axle loads to be greater than that required by road regulations. Therefore, the present inventors have conceived of the idea of providing additional rear axles, such as by providing first and second rear axles. The first and second rear axles can accommodate an increased crane mass to allow the crane to be driven on public roads at highway speeds.

However, simply providing a second rear axle can hamper the crane when lifting and carrying loads, that is, when operating in a crane mode. For example, having a second rear axle can increase the wheelbase length of the crane, and this can decrease the maneuverability of the crane. Accordingly, the present inventors have conceived of the idea of having one of the rear axles, such as the first rear axle, arranged to be displaced relative to the second rear axle, such that wheels of the first rear axle are able to selectively engage or disengage with the ground or vice versa.

This arrangement can maintain the maneuverability of the crane (i.e. when in crane mode) in a manner similar to known two axle pick and carry cranes, but can allow the crane to have an increased weight to provide a greater counteracting forward tipping moment, which increased weight crane can also be driven on public roads.

In an embodiment of the crane, whilst the first rear axle to be displaced can be that axle which is further from a rear of the rear body (i.e. further than the second rear axle), typically the first rear axle is that axle which is arranged closer to the rear of the rear body (i.e. closer than the second rear axle). This location of the first rear axle can further help to maintain the maneuverability of the crane (e.g. when in crane mode) in a manner similar to known two axle pick and carry cranes.

In a further embodiment of the crane, each of the first and second rear axles may be able to be displaced. Thus, when operating in a crane mode, an optimum axle to be displaced can be selected by the operator or may be automatically selected by a programmable controller.

In an embodiment, the crane may be adapted to operate in a travel mode in which the wheels of the first rear axle selectively engage the ground, and a crane mode in which the wheels of the first rear axle selectively disengage the ground. When in travel mode, the crane may have a ground speed of 60, 70, 80, 90, 100 or 110 km/h.

In an embodiment, the crane may be adapted to change from the crane mode to the travel mode at a predetermined ground speed of the crane. The change from the crane mode to the travel mode may occur automatically (i.e. the disengaged axle may be automatically lowered). The predetermined ground speed of the crane at which the change occurs may be less than around 10 km/h and may occur at around 5 km/h.

In an embodiment, each of the first and second rear axles may comprise a respective suspension system. The suspension system for the first rear axle may be arranged to displace the first rear axle to cause its wheels to selectively engage or disengage with the ground. In an embodiment, the crane may further comprise a respective suspension system for the front axle. The front axle suspension system may be arranged to allow for a frame of the front body to rest on and transfer load directly to the front axle during the crane mode. This action can accommodate a heavier overall weight of the loaded crane.

A crane that has the first rear axle arranged to be displaced relative to the second rear axle may be configured otherwise as set forth above (i.e. with an added first counterweight). As set forth above, the front body may be pivotally connected to the rear body to define the crane as an articulated pick and carry crane. Wheels for the crane may each comprise rubber tyres.

The pick and carry crane as disclosed herein may be configured to have a MRC of at least 30, 35, 40, 45 or 50 tonne.

The pick and carry crane may comprise steering for at least one set of rear wheels.

The steering may be for a rearmost set of wheels. The steering for the rearmost set of wheels may be in addition to steering provided for a front set of wheels. The steering for the rearmost set of wheels may be controlled in dependence on a degree of articulation of the crane. The steering for the rearmost set of wheels may have a predetermined maximum deflection for the rearmost set of wheels.

Also disclosed herein is a method of operating a pick and carry crane having a front body that defines a front part of the crane. As above, the front body is pivotally connected via a pivot arrangement to a rear body of the crane (i.e. articulated).

In use of the crane, the front and rear bodies define a side tipping line when the front body has been pivoted relative to the rear body about the pivot arrangement. The side tipping line is again defined as an imaginary longitudinal axis that extends between a point at which the front body contacts the ground to a point at which the rear body contacts the ground, being the points about which the crane may topple. A first counterweight is mounted with respect to the crane. As set forth above, typically the point at which the front body contacts the ground is via inner tyre(s) of the front body, and typically the point at which the rear body contacts the ground is via inner tyre(s) of the rear body (i.e. when the crane is articulated).

In accordance with the disclosure, the method comprises operating the crane so as to lift and/or carry a load with respect to the front body of the crane. The method also comprises pivoting the front body relative to the rear body to define the side tipping line. The method further comprises moving the first counterweight with respect to the side tipping line so as to maintain a counteracting side tipping moment above a threshold value when the crane is lifting and/or carrying the load. The threshold value corresponds to a side tipping moment that causes the crane to topple sideways about the side tipping line.

In an embodiment of the method, the first counterweight may be moved with respect to the side tipping line by rotation from a position rearward of the pivot arrangement. This rotation can, for example, occur automatically with crane articulation.

Also disclosed herein is a method of operating a pick and carry crane having a front body that defines a front part of the crane. As above, the front body is pivotally connected via a pivot arrangement to a rear body of the crane (i.e. articulated). The rear body comprises first and second rear axles, each for supporting the rear body on the ground In accordance with the disclosure, the method comprises displacing the first rear axle relative to the second rear axle to engage or disengage wheels of the first rear axle with the ground (or vice versa).

In accordance with the method, the wheels of the first rear axle may be engaged with the ground when the crane is operated in a travel mode, and the wheels of the first rear axle may be disengaged with the ground when the crane is operated in a crane mode. As set forth above, this engagement and disengagement may occur automatically as part of a controlled operation procedure of the crane.

Also disclosed herein is a pick and carry crane that is operated according to the methods as set forth above.

A further embodiment extends to a mobile articulated crane having a boom for carrying a load when the crane is stationary and while the crane is mobile, said boom having a first end for engaging with a load and an opposed end, the crane further comprising a counterweight attached to the boom at or close to the opposed end of the boom.

The counterweight may be displaceable and an extent of displacement of the counterweight may be dependent upon one or more of: an extent of articulation of the crane; on an extension of the boom and a speed of the crane.

BRIEF DESCRIPTION OF THE DRAWINGS

Non-limiting embodiments will now be described, by way of example only, with reference to the accompanying drawings, in which:

FIG. 2 shows a side view of the pick and carry crane.

FIG. 3 shows a plan view of the pick and carry crane.

DETAILED DESCRIPTION OF SPECIFIC EMBODIMENTS

Figure 1:
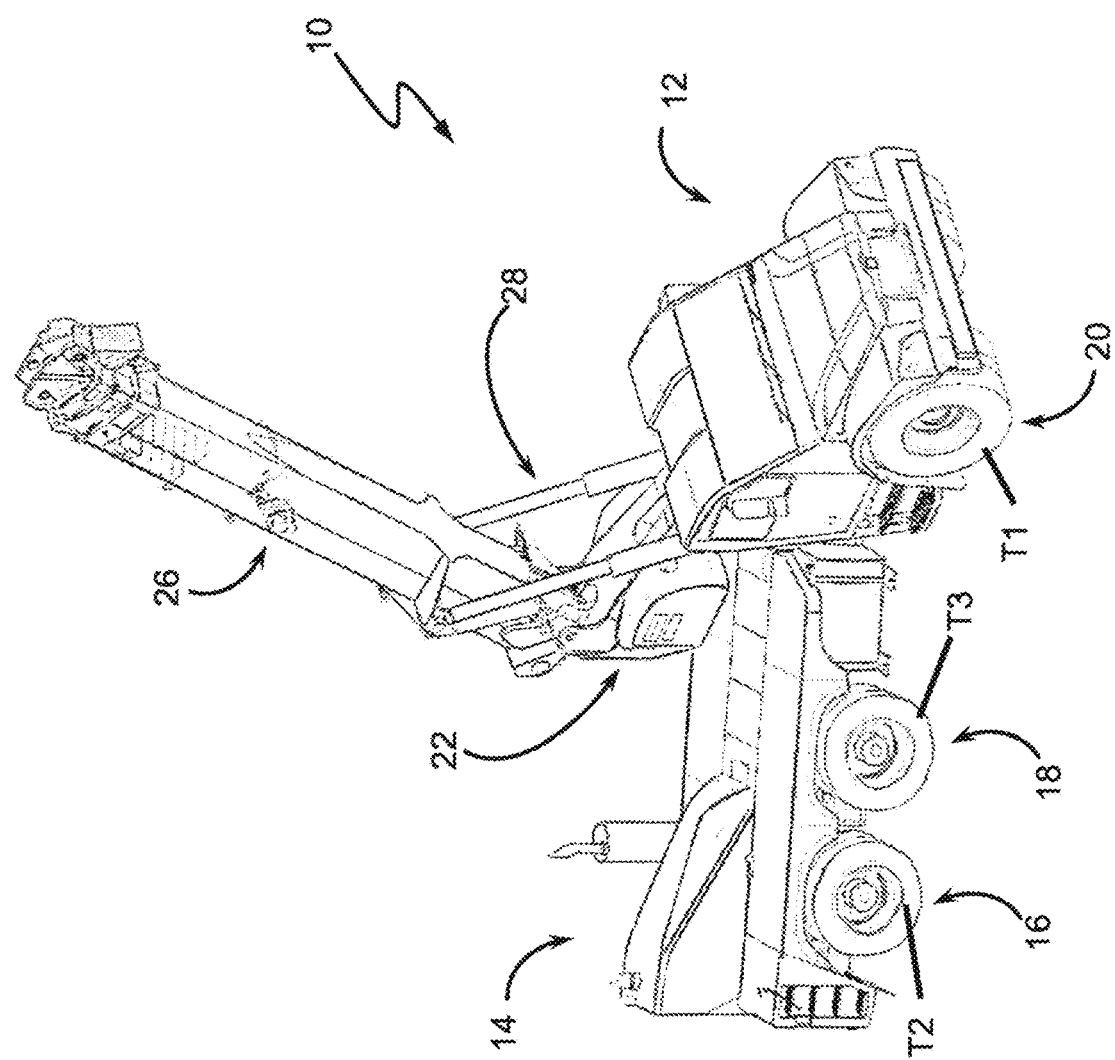
FIG. 1 shows a perspective view of an embodiment of a pick and carry crane.

FIGS. 1, 2 and 3 show a pick and carry crane 10. The crane 10 has a front body 12 which is the front part of the crane 10. The front body 12 is pivotally connected via a pivot arrangement 30 (exemplified by the dashed line in FIGS. 2 and 3) to a rear body 14 of the crane 10. The pivot point 30 may be provided with moveable linkages, such as hydraulic rams, to control the pivot angle of the front body 12 to the rear body 14. Adjusting the pivot angle using the moveable linkages helps to turn the crane 10. A side tipping line 34 (see FIG. 4) is defined when the front body 12 is pivoted relative to the rear body 14.

In the embodiment of the pick and carry crane 10 as depicted in the Figures, the side tipping line 34 is an imaginary longitudinal axis that extends between a point at which the inner tyres T1 of the front body contact the ground, via wheel 20, and a point at which one of the inner tyres T2 and T3 of the rear body contacts the ground, via either wheel 16 and/or 18 (i.e. depending on which tyre is engaged with the ground when the crane is in crane mode—described below). Thus, the tyres T1-T3 of the wheels 20, 16 and 18 define the points about which the crane may topple sideways.

The crane 10 is provided with a first counterweight 22 mounted with respect to the crane 10. The counterweight 22 is arranged to move with respect to the side tipping line 34 so as to maintain a counteracting side tipping moment above a threshold value when the crane is lifting and/or carrying a load. The threshold value corresponds to a side tipping moment that causes the crane to topple sideways about the side tipping line 34.

Attached to the rear end of the front body 12 is a boom support arm 24. The boom support 24 may be a separate structure that is mounted e.g. welded or bolted to the front body 12. In an embodiment, the boom support arm 24 forms part of the chassis of the front body 12. The boom support arm 24 pivotally supports boom 26, where the boom 26 is raised and lowered about the pivot point, represented by pin 27 (FIG. 2), using linear actuators in the form of hydraulic rams 28. The boom 26 may have a fixed length or may be telescopic. Other forms of linear actuators can be used in place of or in addition to rams 28. In FIGS. 1 to 3, the counterweight 22 is mounted to an opposite end of the boom support arm 24 so that counterweight 22 is located rearwardly of the pivot arrangement 30.

Figure 4:
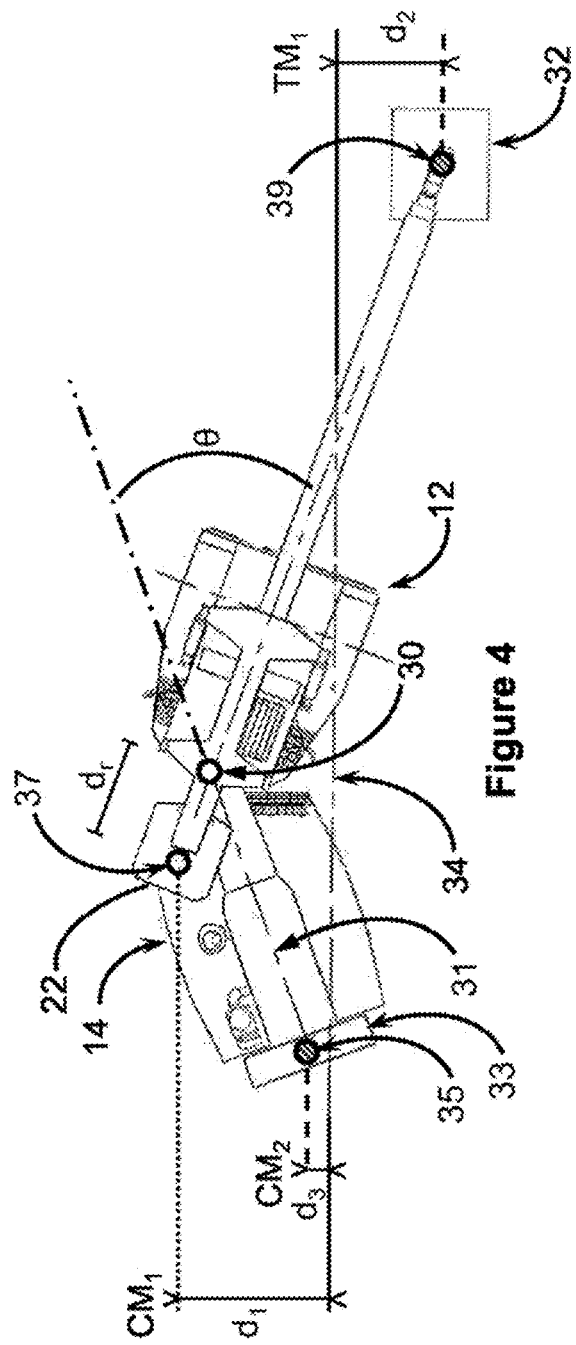
FIG. 4 shows a plan view of the pick and carry crane when pivoted (articulated).

The arrangement of the counterweight 22 and how it moves with respect to the side tipping line 34 is shown in FIG. 4. The side tipping line 34 extends between the tyre T1 of inside front wheel 20 and one of the tyres T2 or T3 of a respective inside rear wheel 16 and/or 18 (i.e. depending on which tyre is engaged during the crane mode—described below).

When the crane 10 is driving approximately straight ahead, the counterweight 22 is positioned approximately over the centre line, represented by dashed line 31, of the rear body 14. However, when the crane 10 is articulated (i.e. pivots) about the pivot point 30 when turning, as shown in FIG. 4, the counterweight 22 rotates away from centre line 31, about pivot point 30, so as to be displaced from the tipping line 34 by distance $d_1$. Distance $d_1$ is calculated as a perpendicular line from the tipping line 34 to the centre of gravity of the counterweight 22, as represented by dot 37. It should be noted that the centre of gravity of counterweight 22 will differ depending on the shape and orientation of the counterweight used in crane 10, such that the CoG 37 depicted in FIG. 4 is exemplary only.

The distance $d_1$ is also dependent on the distance $d_r$ of the centre of gravity 37 of counterweight 22 to the pivot point 30. Thus, $d_1$ generally increases as $d_r$ increases for a given angle θ. The turning angle θ formed between the front body 12 and rear body 14 also determines $d_1$, where $d_1$ generally increases as θ increases. The maximum turning angle θ can be dependent on the size of crane 10 and the intended use of the crane. The maximum turning angle θ may be 90, 80, 70, 60, 50, 40 or 30 degrees or less. In the crane embodiment depicted, the maximum turning angle θ is approximately 40 degrees. When fully articulated, the whole crane 10 fits within the envelope of the turning circle. This feature of the crane 10 can be particularly useful in congested spaces. In practice this means that, when the steering angle is kept constant, and if the front corner of the crane can pass an object, then the whole of the crane will clear. This can leave the operator free to concentrate on what is in front of them, and also to concentrate on what is happening with the load.

In an alternative embodiment, the first counterweight 22 can be provided on a moveable framework that is mounted to the front body 12. The moveable framework can be controlled to pivot laterally, from side-to-side, on the front body 12.

When crane 10 is turning when carrying a load 32, as in FIG. 4, the load 32 exerts a side tipping moment $TM_1$ on the crane 10. The side tipping moment $TM_1$ is determined by the mass of load 32 and the perpendicular line distance $d_2$ that the centre of gravity of the load (as represented by dot 39) is away from the tipping line 34. In this regard, $TM_1$=mass of load 34×distance $d_2$ from tipping line. The side tipping moment $TM_1$ represents the threshold value. Further, $TM_1$ increases as θ increases since $d_2$ increases as θ increases. Therefore, as counterweight 22 pivots away from tipping line 34 by distance $d_1$ when the front body 12 pivots about pivot point 30, a counteracting side tipping moment, represented by $CM_1$, is provided. Accordingly, provided that $CM_1 \geq TM_1$, the crane 10 should not tip about tipping line 34 and thus topple over.

Since $TM_1$ is determined by a variety of factors including load mass, boom length and angle θ, sensors such as load, angle and/or mechatronic sensors may be positioned on crane 10 to provide inputs to calculate $TM_1$. $TM_1$ can be calculated in real time. $TM_1$ can be calculated using one or more on-board computers and/or computer systems. The one or more computers and or computer systems can provide operator feedback to ensure $CM_1 \geq TM_1$ in use of crane 10.

Counteracting moment $CM_1$ is generally only determined by angle θ because the mass of the counterweight and position of counterweight 22 relative to pivot point 30 is generally fixed.

The crane 10 may use programmable computer logic (PCL) to ensure $CM_1 \geq TM_1$ in use of the crane 10. The PCL may be provided as software or firmware on the one or more computers and/or computer systems. The PCL may use input signals from sensors positioned on crane 10. If the PCL determines that $TM_1$ is approaching and/or exceeding $CM_1$, e.g. by an operator turning the crane 10 to increase θ, the PCL may instruct the operator to reduce θ. Alternatively, the PCL may reduce θ by, for example, controlling the movably linkages provided at the pivot point. In the embodiment of the pick and carry crane 10 as depicted in the Figures, the MRC of crane 10 is 40 tonnes, and the load moment of crane 10 is 66 tonne meters. These values can vary when the overall configuration of the pick and carry crane 10 is varied, and so should be seen as non-limiting.

Because the width of crane 10 is generally restricted by regulations that permit the crane 10 to drive on public roads at highway speeds, the width of the crane 10 cannot be increased to provide an increased counteracting side tipping moment. A wider crane will typically provide a greater counteracting side tipping force compared to a narrower crane of the same weight. Therefore, use of counterweight 22 can help to increase the counteracting side tipping moment for pick and carry cranes whilst still allowing the crane to comply with road regulations.

The rear body 14 can be provided with a second counterweight 33 that has a centre of gravity represented by dot 35. Counterweight 33 is positioned at the rear end of rear body 14. The purpose of the second counterweight 33 is to provide a counteracting front tipping moment to prevent the crane 10 from tipping forward over the front tipping point (see FIG. 7b), which is the point of ground contact at the front body 12. In the embodiment in FIG. 7a, this front tipping point takes the form of an imaginary forward tipping line 40 that extends between the ground contact points of tyres T1 of the front wheels 20 at either side of the crane.

In an alternative embodiment, the second counterweight 33 can be provided by an increased weight of the rear body 14 (e.g. integrated into the rear body 14).

Figure 5:
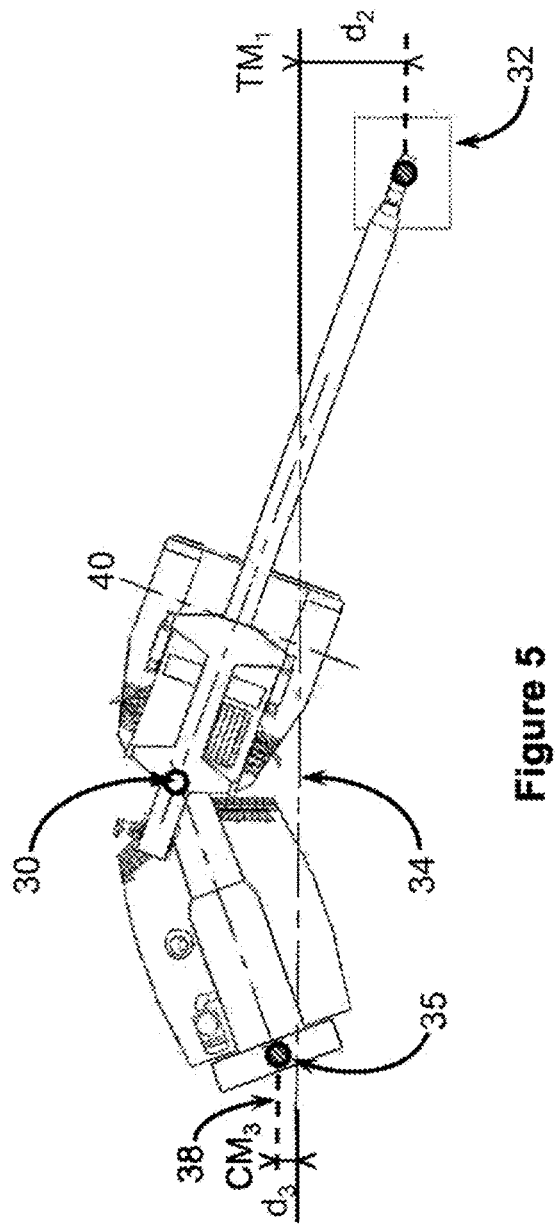
FIG. 5 shows a plan view of another pick and carry crane when pivoted (articulated).

As shown in FIGS. 4 & 5, the rear counterweight 33 has a centre of gravity 35 located close to the side tipping line 34. The counteracting side tipping moments $CM_2$ and $CM_3$ shown respectively in FIGS. 4 & 5 are each determined by the perpendicular line distance $d_3$ from the tipping line 34 to the centre of gravity 35. If counterweight 22 was omitted from the crane 10, as shown in FIG. 5, the only counteracting side tipping moment would be that provided by $CM_3$. Conversely, in FIG. 4, the counteracting side tipping moment=$CM_1+CM_2$.

It should be noted that counterweight 33 is mounted on the rear body behind the rear contact point of the tyres T2, T3 of rear wheels 16 and 18. Thus, $CM_3$ decreases as θ increases. If the second counterweight 33 was located in front of this rear contact point, i.e. closer to pivot point 30, this would decrease the counteracting forward tipping moment, which would likely decrease the overall MCR and moment load of crane 10. Hence, it is generally preferable to place second counterweight 33 further away from pivot point 30 rather than closer to it. In short, without counterweight 22, crane 10 can be more prone to toppling over the tipping line 34 as the angle θ increases, because the only counteracting side tipping moment would then be $CM_3$. By providing counterweight 22, the pick and carry crane 10 is able to lift, carry and turn with loads far in excess of conventional pick and carry cranes. It can be seen that the counterweights 22 and 33 are positioned to work cooperatively in use of the crane.

In a further alternative embodiment, the second counterweight can be mounted to a second moveable framework. The second moveable framework can be mounted with respect to the rear body 14 of the crane 10. The second counterweight is mounted to the moveable frame in such a way that the second counterweight can be located at the rearward end of the rear body of the crane or be moved laterally therefrom. In this way, the second counterweight may be able to move to provide both a counteracting forward tipping moment $CM_4$ (FIG. 7a) and a counteracting side tipping moment $CM_2$ (FIG. 4). The moveable frame may comprise linear actuators such as hydraulic rams that can use the second counterweight. The second counterweight may be positioned at an end of an arm that can be rotated about a pivot point located on the rear body 14.

As set forth above, in FIG. 4, the total counteracting side tipping moment is a sum of the first and second counteracting side tipping moments i.e. $CM_1+CM_2$. However, because distance $d_1$ is generally much greater than $d_2$, the mass of counterweight 22 can be significantly less than the combined mass of the second counterweight 33 plus the rear body 14 to provide an adequate overall counteracting side tipping moment. Expressed another way, the radius to the side tipping counterweight 22 is much larger, hence the mass can be smaller and it will still have a significant benefit.

The first counterweight 22 can have a mass greater than 100, 250, 500, 750 or 1000 kg. In the crane embodiment of FIG. 4, the first counterweight 22 has a mass of about 3300 kg. In the crane embodiment of FIG. 4, the mass of the second counterweight 33 is about 3000 kg. The weight of the rear body 14 is 14000 kg. Further, the centre of gravity of the rear body can be shifted rearwardly by the second counterweight 33.

Figure 8:
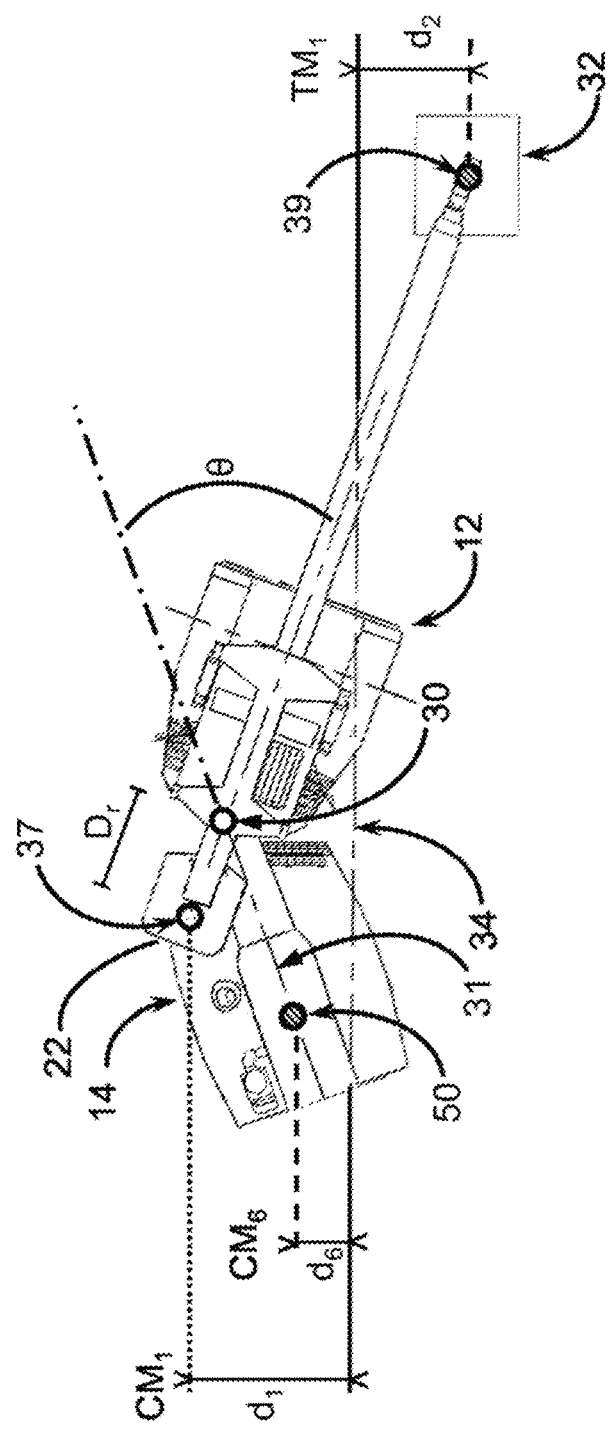
FIG. 8 shows a plan view of yet another pick and carry crane when pivoted (articulated).

As mentioned above, not all pick and carry cranes need be provided with a second counterweight as depicted in FIG. 4. For example, in the crane embodiment of FIG. 8, the counteracting front tipping moment is provided only by the mass of the rear body 14. The centre of gravity 50 of the rear body in the embodiment in FIG. 8 is positioned approximately over the centre of the rear wheels. However, even when the crane is articulated by angle θ, the distance $d_6$ is approximately similar to $d_3$. Therefore the counteracting side tipping moment $CM_6$ provided by the rear body 14 in FIG. 8 is approximately similar to $CM_2$ as shown in the embodiment of FIG. 4. Accordingly, in order to provide an increase in the counteracting side tipping moment in the absence of counterweight 22, the mass of the rear body 14 is significantly increased. However, as described below, the weight of the rear body can be limited due to road regulations. Hence, the use of counterweight 22 to provide a counteracting side tipping moment can allow the crane 10 to lift and carry greater loads compared to cranes without counterweight 22 without the need to significantly increase the weight of the rear body.

The centre of gravity of the rear body described herein is exemplary only. Accordingly, the actual position of the centre of gravity will be determined by the shape and orientation of the rear body and the components and mass comprising the rear body.

While the embodiments shown in FIGS. 1 to 4, 6 & 7 have the first counterweight 22 fixed to the boom support arm, as set forth above the first counterweight may be moved with respect to the tipping line 34 using other means. For example, the crane may further comprise a moveable frame that is mounted to the crane for movement with respect to the side tipping line 34. The moveable frame can be mounted to the front or rear body. There may be separate moveable frames on both the front and rear bodies. The first counterweight can be attached to the moveable frame so as to provide a counteracting side tipping moment e.g. $CM_1$. The moveable frame may comprise linear actuators such as hydraulic rams. In this way, the first counterweight may be attached to the linear actuators and may be moved laterally away from the tipping line when the front body 12 pivots about pivot point 30 to form angle θ. The moveable frame may be mounted to have a rotational or pivotal movement. When rotational/pivotal movement is used, the first counterweight may be attached at an end of an arm mounted to either the front body 12 or rear body 14. When the front body 12 pivots about pivot point 30, the arm can move laterally away from the side tipping line 34. A moveable frame that uses rotational/pivotal movement can operate in a similar manner to the crane embodiment shown in FIGS. 1 to 4. However, by having the first counterweight separate from the boom support arm 24, the crane may be more compact whilst still maintaining the same load moment capacity.

In a further alternative embodiment, two first counterweights can be provided, with one counterweight being attached to boom support arm 24 as in FIGS. 1 to 4, and the other being mounted to the moveable frame. The moveable frame may have mechatronic sensors that can communicate with one or more on-board computers and/or computer systems. The one or more computers and/or computer systems may control the moveable frame so as to optimise the counteracting side tipping moment. When a moveable frame is used, the first counterweight may be considered a dynamic counterweight. If a dynamic system is used, then it may be necessary to control the movement of the counterweights such that, in one configuration at least, the entire crane fits within the turning circle at full articulation angle.

The crane embodiment described in FIGS. 1-4, 6 & 7 is shown with two rear axles. Generally, by providing a crane 10 that has more than two rear axles allows the crane to lift and carry larger loads compared to a conventional two axle pick and carry crane. In the crane 10 of FIGS. 1 to 4, 6 & 7, the front body 12 has a front axle for supporting the front body on the ground via front tyres T1 of wheels 20. The rear body 14 has first and second rear axles, each for supporting the rear body on the ground, via first rear tyre T2 of wheel 16 and second rear tyre T3 of wheel 18, respectively. The first rear axle is arranged to be displaced relative to the second rear axle such that the tyre T2 of wheel 16 can be selectively engaged (FIG. 2) or disengaged (FIG. 6) with the ground 21.

In a variation, the second rear axle can be arranged to be displaced relative to the first rear axle such that the tyre T3 of wheel 18 can be selectively engaged or disengaged with the ground 21.

The turning circle of crane 10 is determined by the distances between the pivot point 30 and the respective wheels. The tyres of wheels 18 and 20 are always in contact with the ground 21. Therefore, when the tyre of wheel 16 is disengaged with the ground 21 (e.g. FIG. 6), the turning circle of crane 10 is determined by distance $D_a$ and the degree of articulation e.g. maximum angle θ. In an embodiment distance $D_a$ is 4750 mm. The overall length of crane 10 from the rear end of the rear body 14 to the tip of the boom 26 in a retracted state, e.g. FIG. 2, can be 11700 mm. The length from the rear end of the rear body 14 to the front end of the front body 12 can be 8430 mm. The crane 10 can have a height from the road 21 to the top of boom 26 of 3470 mm. While the term "road" has been used, the term road can include any surface on which crane 10 is driven in either crane or travel modes. For example, "road" may include asphalt, gravel, concrete and compacted dirt, and may be "off-road".

Figure 6:
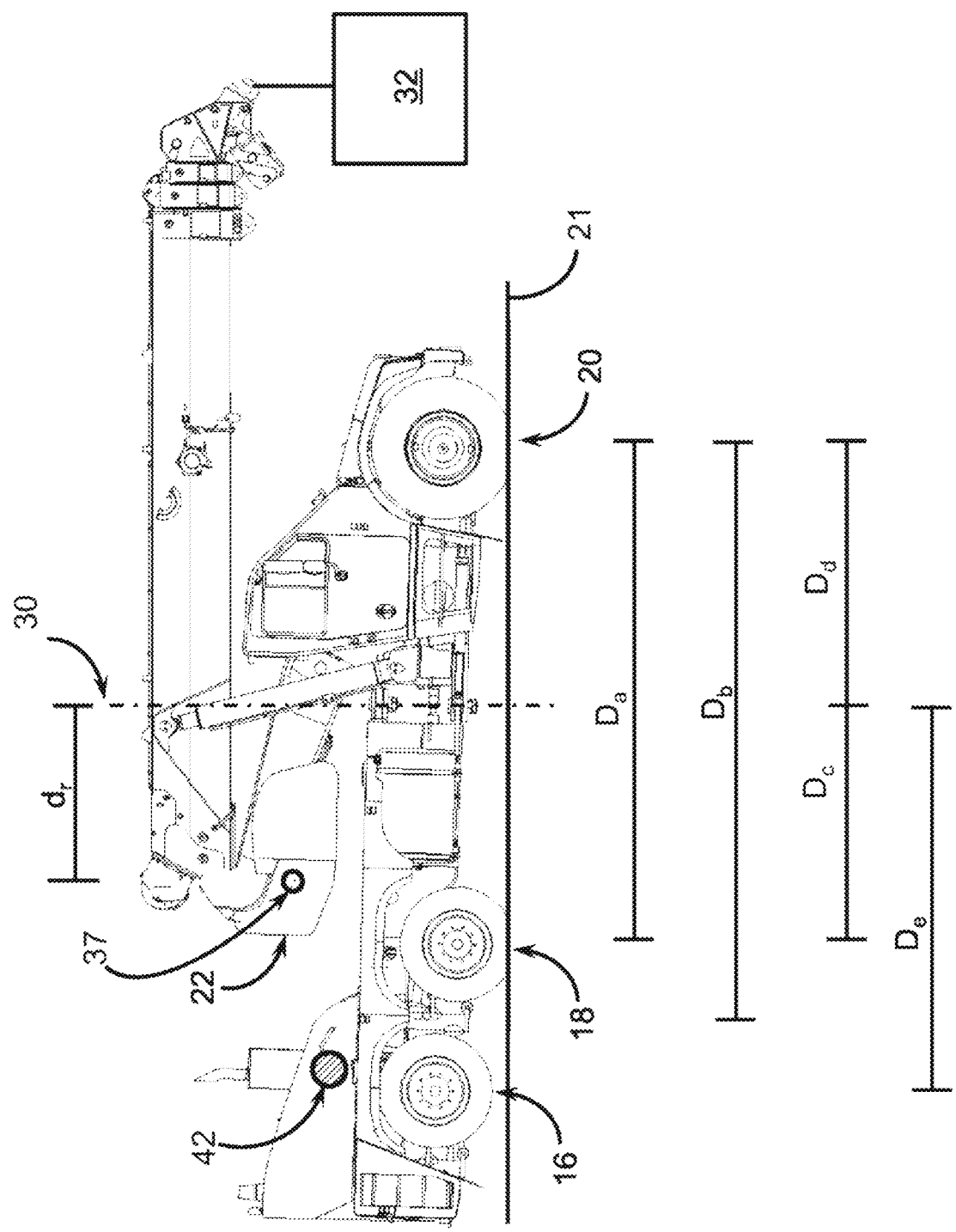
FIG. 6 shows a side view of the pick and carry crane of FIG. 1 carrying a load.

As shown in FIG. 6, the distance from the pivot point 30 to the front wheel 20 and the distance from the pivot point to wheel 18 is the same. This can help to ensure that the rear body 14 follows the front body 12 when the front body moves through a tight space when cornering e.g. through a gap just wide enough for the crane 10. However, in some embodiments, the distance from the pivot point 30 to the front wheel 20 and the distance from the pivot point to wheel 18 is not the same. When the tyre of wheel 16 is engaged with the ground 21 (as shown in FIG. 2), the wheelbase length increases to distance $D_b$. Distance $D_b$ is calculated as the average distance both wheels 16 and 18 are spaced from pivot point i.e. the average of distance $D_c$ and $D_e$. In an embodiment, distance $D_b$ is 5450 mm, $D_c$ is 2475 mm, $D_d$ is 2475 mm, and $D_e$ is 3875 mm.

By having the wheels closest to the rear of the rear body 14, i.e. wheel 16, move between an engaged and disengaged state with road 21, the rear wheels that are closest to the pivot point 30, i.e. the tyres of wheels 18, are always in contact with the ground. Because the tyres of wheels 18 are always in contact with the ground, the wheelbase length of the crane 10 decreases when the tyres of wheels 16 are lifted off the ground. This can help to decrease the radius of turning and improve the turning circle. In some embodiments, the turning circle of crane 10 is similar to a standard pick and carry crane that only has two axles and a lower load moment capacity.

Having more than two axles can help to spread the forces exerted onto the crane more evenly onto road 21. By providing more than two axles, the crane 10 is able to comply with road regulations. For example, in Australia, the maximum load that each axle can carry for special purpose vehicles is limited to 12 tonnes. Therefore, the weight of the crane is limited to 24 tonne for a two axle crane. By having three axles, the weight of the crane can be up to 36 tonne whilst still complying with road regulations. This can allow crane 10 to drive on sealed roads so as to travel between sites of operation e.g. a manufacturing floor or building site.

However, at sites of operation, regulated axle load limits do not always need to be met, since the surface on which the crane 10 operates may be rated for more than 12 tonne of load per axle. For example thick concrete slabs can handle axle loads far greater than 12 tonne per axle. Since only two axles may be needed in operation, i.e. when the crane 10 is operating in crane mode, the tyres of rear wheel 16 can be lifted off the road 21 to improve the turning circle of crane 10. In this way, the crane 10 is configured to operate in a travel mode when the tyres of wheel 16 are selectively engaged with the road/ground, and a crane mode when the tyres of wheel 16 are selectively disengaged the road/ground.

Because the tyres transfer the weight of the crane 10 and load 32 onto the ground, they may be rated up to 14000 kg. The weight limit of a tyre for a pick and carry crane can also be determined by the rotational speed of the tyre. Therefore, if the crane 10 operates at a speed above a level that is suitable for a particular tyre, the tyre can be damaged and can rupture. Therefore, crane 10 may be configured to change between having one axle raised and having both axles engaged with the road, once the ground speed of the crane has reached a predetermined ground speed of the crane. The predetermined ground speed may be 1, 2, 3, 4, 5, 6, 7, 8, 9 or 10+ km/h. Specifically, the predetermined ground speed may be around 5 km/h.

In circumstances when the crane 10 is carrying a load and is operating in crane mode, if the ground speed of the crane increases above the predetermined speed, the crane 10 may lower rear wheel 16 and convert into travel mode, even though the crane 10 is still carrying a load. Once the ground speed drops below the predetermined speed the rear tyre of wheel 16 can be lifted to convert the crane 10 back into crane mode. Converting crane 10 from two axle mode to three axle mode, even when lifting and/or carrying a load, will sacrifice maneuverability, but can help to improve the damage, wear and lifespan of the tyres T1-T3 of wheels 16, 18 and 20. In an embodiment, when in travel mode, crane 10 can drive at highway speeds, for example 80 km/h or higher.

Conversion between travel mode and crane mode may be performed manually or automatically. Manual conversion may involve an operator instructing the crane 10 to engage the tyres of wheel 16 with the road 21. The operator may be instructed by a signal from the LMI and/or PCL. Automatic conversion may help to reduce operator error. It may also allow a crane operator to simply drive from site to site without having to worry whether or not the tyres of wheel 16 need to be engaged or disengaged with road 21.

The first axle rear wheel i.e. wheel 16 may be raised and lowered using air bag suspension systems, hydro-pneumatic suspension systems and/or springs with auxiliary air bags or hydraulic cylinders to raise selected axles. The suspension system can employ integrated control by a Load Moment Indicator (LMI) so that, at any time, control of the crane functionality and the suspension system may be coordinated. Conditions that may require changes to the suspension configuration can arise from a number of different crane components. Also, when in crane mode (e.g. FIG. 6), there are many conditions that can limit or over-ride changes to suspension configuration, or on other occasions actually trigger a suspension system change (e.g. going over the predetermined ground speed). Therefore, the suspension system in crane 10 may be fitted with one or more sensors to monitor, for example, axle load, individual wheel load, axle height position, and wheel rotation speed. The LMI control system may control the suspension e.g. hydro-pneumatic suspension systems and/or springs with auxiliary air bags or hydraulic cylinders, and the software in the LMI may take inputs from the one or more sensors before making suspension system changes. The changes may be automatic, or they may alert a crane operator that the suspension system needs adjusting.

Other axle configurations that assist with crane operation can be included. For example, when traversing rough terrain to reach a job site, it may be useful to get higher ground clearance. If airbag or hydro-pneumatic suspension is utilised, then a high clearance mode may be possible by adjusting the suspension. Each axle may be fitted with airbag or hydro-pneumatic suspension so that each axle is independently controllable. Therefore, if a higher ground clearance is required, the suspension system(s) of the axles that engaged with the ground may be raised. Each wheel may be independently controlled with its own suspension system. This may help to control individual wheel loads. Further, wheels on one side of the crane 10 may be raised relative to the wheels on the other side. This may help crane 10 to adjust to uneven and sloping ground, and may help to stabilise the crane 10 when travelling across an inclined surface when either in crane mode or travel mode. For example, if crane 10 is travelling across an incline that slopes down to the right, the ride height of the wheels on the right may be increased to level the crane. This may be useful in stabilising the crane when operating in crane mode since the load being carried will tend to exert a sideways tipping moment on the crane.

Having first and second rear axles, each for supporting the rear body on the ground, via first rear tyre T3 of wheel 16 and second rear tyre T3 of wheel 18, respectively, can also allow crane 10 to slew around one wheel. Slewing is the angular movement of a crane boom or crane jib in a horizontal plane. With traditional two axle pick and carry cranes, a holding brake can be applied to one of the wheels and then three of the wheels are free to rotate in either direction. Therefore, during slewing, the free wheels are able to rotate throughout the change in articulation, with the pivot point of slewing being provided by the wheel to which the holding brake has been applied. When one of the crane bodies, e.g. the rear crane body 14, has two or more axles with tyres in contact with the ground, the slewing ability of the crane is diminished or lost. For example, during any slewing movement, one or the two axles would be dragged sideways during the operation. This can lead to very poor tyre wear, and may also lead to vibration and a jerking movement of the crane during load carrying, which will affect crane usability and also safety, as it can also induce load swing. Therefore, by having rear tyres T2 of wheel 16 moveable between engaged and disengaged states, the slewing ability of crane 10 may be similar to conventional two axle pick and carry cranes when operating in crane mode.

Figure 7A:
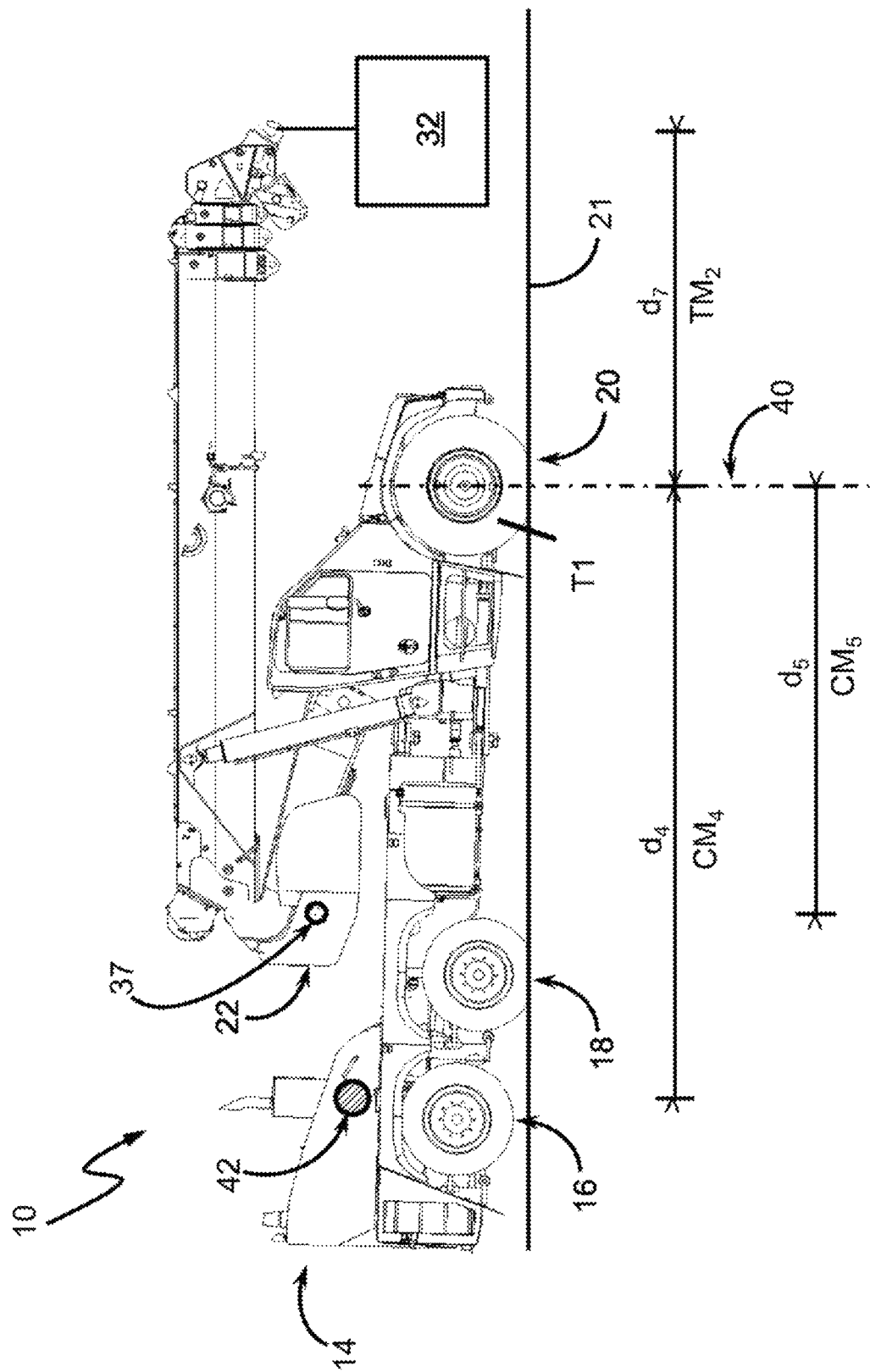
FIG. 7a shows a side view of the pick and carry crane carrying a load.

Since crane 10 is able to lift and carry greater loads compared to traditional pick and carry cranes, the loads placed onto the front axle and front tyres 20 tend to increase. Referring to FIG. 7a, as the forward tipping moment increases, represented by $TM_2$, the load transferred to the front wheels 20 increases. The front tipping moment is calculated from the front tipping line, represented by dashed line 40, which in the embodiment of FIG. 7a is determined by the front tyres T1 of opposite front wheels 20.

For embodiments where the boom 26 is telescopic, the forward tipping moment $TM_2$ is dependent on the distance $d_7$ the load 32 is away from where the tyres T1 of front wheels 20 engage the ground (forward tipping line), and the mass of the load 32. Therefore, the forward tipping moment $TM_2$ increases as the boom length increases for a given load mass. The crane 10, therefore, must provide an adequate counteracting forward tipping moment to prevent the crane 10 from tipping forwards. As an example of a counteracting tipping moment, the centre of gravity of the rear body 14 is positioned at dot 42. Therefore, the rear body counteracting tipping moment $CM_4$ is determined by the mass of the rear body 14 and the distance $d_4$ of the centre of gravity 42 from the forward tipping line 40.

The counterweight 22 also provides a counteracting forward tipping moment $CM_5$ determined from its centre of gravity 37. More specifically, the counteracting forward tipping moment $CM_5$ is determined by the mass of the counterweight 22 and the distance $d_5$ of its centre of gravity 37 from the forward tipping line 40. Therefore, not only does counterweight 22 help to maintain a counteracting side tipping $CM_1$ moment above a threshold value when the crane is lifting and/or carrying a load, it can also help to maintain a counteracting forward tipping moment. However, the mass of counterweight 22 is generally less than the mass of the rear body 14 and, since the centre of gravity 42 of the rear body 14 is further away from tipping line 40 than the centre of gravity 37 for counterweight 22, $CM_5$ is generally much less than $CM_4$. In any case, provided $CM_4+CM_5 \geq TM_2$, the crane 10 should not tip forward on the tipping line 40.

Figure 7B:
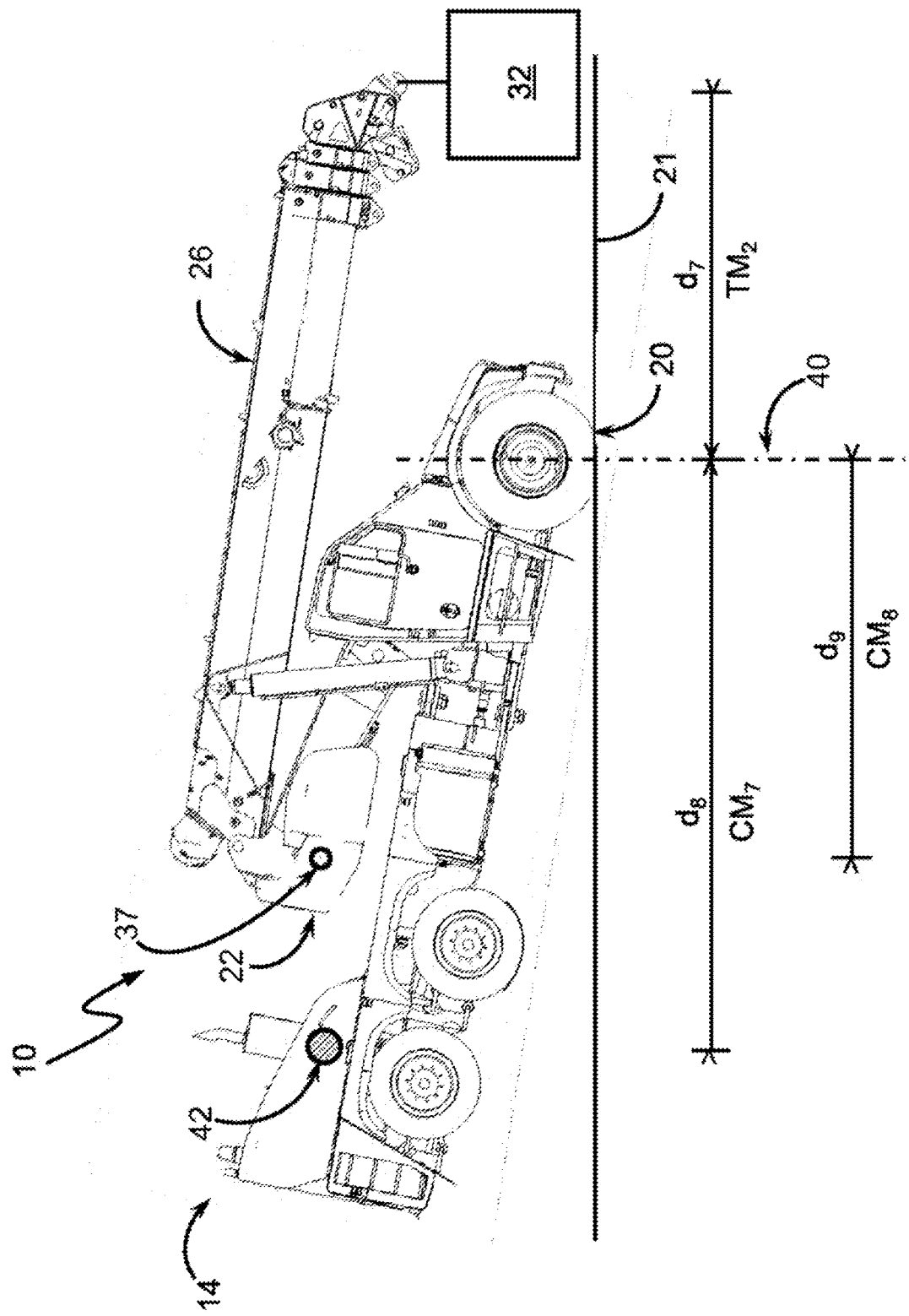
FIG. 7b shows a side view of the pick and carry crane tipping forward when carrying a load.

Since $TM_2$ can increase or decrease depending on the mass of the weight 32 and the length of boom 26, the crane 10 may be fitted with sensors such as load, distance, and angle sensors to determine $TM_2$. The one or more on-board computers and/or computer system used to calculate $TM_1$ may also be used to calculate $TM_2$. $TM_1$ may be calculated at the same time as $TM_2$. $TM_1$ and $TM_2$ may be calculated in real time. One or more computers and/or computer systems can be used to calculate $TM_2$. If the one or more computers and/or computer systems determine that $CM_4+CM_5 \leq TM_2$, the crane 10 may adjust the boom 26 so that $CM_4+CM_5 \geq TM_2$. Alternatively, the crane 10 may warn an operator of the crane that $TM_2$ is approaching $CM_4+CM_5$. FIG. 7b shows the crane 10 is a position that is tipping forward. As the crane begins to tip over the forward tipping line 40, the distance $d_4$ and $d_5$ decreases to $d_8$ and $d_9$, respectively. Therefore, as the distance $d_4$ and $d_5$ decrease, the counteracting forward tipping moments $CM_4$ and $CM_5$ also decrease to $CM_7$ and $CM_8$, respectively. However, provided $CM_4+CM_5 \geq TM_2$ when the crane 10 first picks up the load when on level ground, as in FIG. 7a, the crane 10 should stay level with the tyres of wheels 16 and/or 18 engaged as in FIGS. 2 and 6.

In crane mode, the loads being transferred through the front axle and tyre 20 are generally greater than those of the rear axles and tyres of wheels 16 and 18 when carrying load 32. To accommodate this increase in load, the front axle may have a reactive suspension system. The front axle suspension system can be arranged to allow for a frame of the front body 12 to rest on and transfer load directly to the front axle during a crane mode. Therefore, the high forces can be transferred directly from the frame to the axle without stress to the suspension system (i.e. forces of up to about 56,000 kg). For example, if the suspension system of the front axle uses airbags or other adjustable linkages, the bags may deflate and allow the frame of the front body 12 to drop and rest on the front axle. Alternatively, to maintain the ride height of the crane, supporting members may extend from the frame of the front body 12 and engage with the front axle so as to take the load off the suspension system and transfer weights and loads directly onto the front axle. This may be useful when the crane is operating on uneven ground and a high ground clearance is required. Given the loads passed through the front axle and tyres of wheels 20 are greater than those passed through rear tyres of wheels 16 and 18, the front tyres of wheels 20 may be configured to handle the increased loads. In the Figures, the front tyre of wheel 20 has a larger diameter when compared to rear tyres of wheels 16 and 18. However, in some embodiments, the tyre diameters may be the same, although the front tyre of wheel 20 would still be configured to accommodate the increased loads when lifting and carrying a load.

While the embodiments disclosed herein incorporate both the first counterweight to improve the counteracting side tipping moment and the rear suspension system that can be engaged and disengaged with the ground, some embodiments may only have one of these features. For example, the crane may have only the first counterweight that can move relative to the side tipping line on a crane that has two axles, such as a standard pick and carry crane. Alternatively, the crane may only have the rear suspension system that can be engaged and disengaged with the ground. However, the combination of using a first counterweight 22 that can move with respect to the tipping line and having a rear body 14 that has two axles where one of the axles is arranged to be displaced relative to the other such that tyres of the displaced axle can selectively engage or disengage with the ground, can provide a pick and carry crane that can lift in the vicinity of 20% greater weights and provide a counteracting side tipping moment increased by at least 25% compared with standard pick and carry cranes. This may be achieved without losing any ability for crane 10 to operate as a "taxi crane", without losing slewing capability, with minimal impact on crane operability and safety, and can preserve as closely as possible the current maneuverability and turning circle while in crane mode. In an embodiment, crane 10 is configured to have a load moment rating of at least 40 tonne.

In use, an operator would operate the crane so as to lift and/or carry load 32 using boom 26 from the front body 12. When the operator travels with the load and has to turn, the moveable linkages pivot the front body 12 relative to the rear body 14 to form angle θ. By forming angle θ, side tipping line 34 is created. As shown in in FIG. 4, as the tipping line 34 is created, the counterweight 22 is moved from a central position of the crane and away from the side tipping line 34. In some embodiments, the counterweight 22 is not moved in unison with the formation of side tipping line 34. The counterweight 22 is moved so as to ensure counteracting side tipping moment $CM_1$ is greater than $TM_1$, which in some embodiments is combined with $CM_2$.

In FIG. 4, counterweight 22 is pivoted away from tipping line 34 about pivot point 30. However, if a moveable frame is used to move the first counterweight, the first counterweight is still moved away from side tipping line 34 to maintain a counteracting side tipping moment. The first rear axle of the rear body 14 is also engaged or disengaged depending on whether the crane 10 is operating in crane mode or travel mode. If the ground speed of crane 10 is above a predetermined ground speed, such as 5 km/h, the first rear axle may be moved from a disengaged position to an engaged position to ensure excessive tyre wear does not occur and/or loads are not exceeded. In this way, the operator can operate crane 10 to lift and carry loads.

Figure 9:
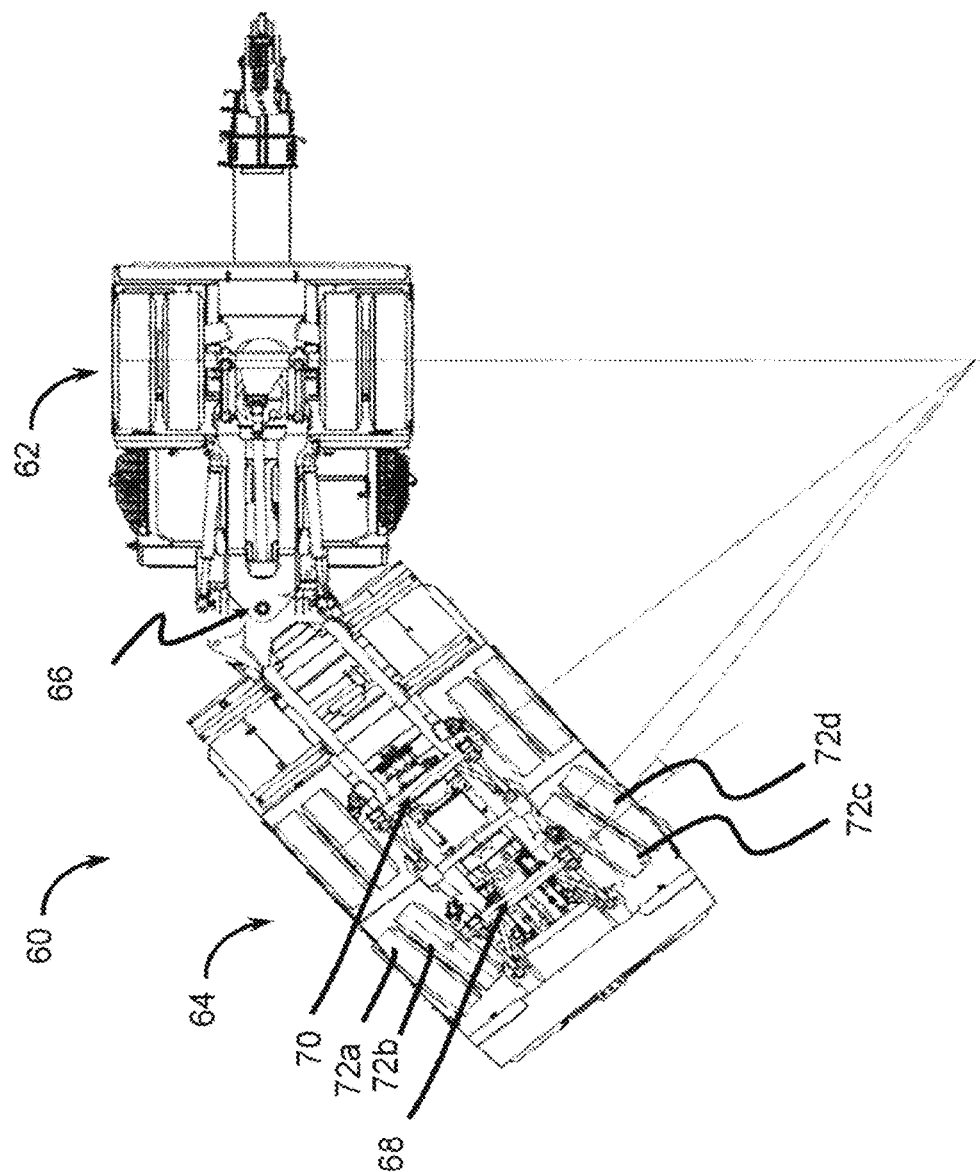
FIG. 9 shows a further embodiment of a pick and carry crane.

FIG. 9 illustrates a further embodiment of a pick and carry crane 60. The pick and carry crane 60 is similar to the embodiments illustrated in FIGS. 1 to 8. The crane 60 has a front body 62 and a rear body 64 connected by means of a pivot point 66. The rear body 64 has a forward axle 70 and a rear axle 68. Both the forward axle 70 and the rear axle 68 support four tyres.

In this embodiment, the pick and carry crane 60 is provided with steering to the wheels supported on the rearmost axle 68. The extent of the deflection provided to the wheels 72a, 72b, 72c and 72d attached to the rearmost axle 68 by the steering is dependent upon the degree of articulation of the rear body 68 relative to the front body 62.

The steering to the rear axle 68 reduces the sheer forces experienced by the tyres of the wheels attached to this axle. Furthermore, in this embodiment, the steering applied to the wheels of axle 68 has a maximum deflection. In the embodiment shown, the maximum deflection is 13°. However, it is to be realised that the amount of the maximum deflection will depend on the specific geometry of the crane to which this is applied.

While the embodiments shown in the Figures describe an articulated pick and carrying crane having rubber tyres, the principles of the disclosure may be extended to other forms of pick and carry cranes, for example pick and carry cranes having crawler tracks.

In the claims which follow and in the preceding description of the pick and carry crane, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

The invention claimed is:

1. A pick and carry crane, the crane comprising:
a front body that defines a front part of the crane, the front body pivotally connected via a pivot arrangement to a rear body of the crane;
the front body comprising a front axle for supporting the front body on the ground; the rear body comprising first and second rear axles, each for supporting the rear body on the ground, each of the first and second rear axles supporting at least a pair of opposing wheels;
wherein the first rear axle is arranged to be displaced relative to the second rear axle such that wheels of the first rear axle selectively engage or disengage with the ground;
wherein the crane is adapted to operate in a travel mode in which the wheels of the first rear axle selectively engage the ground, and a crane mode in which the wheels of the first rear axle selectively disengage the ground; and
wherein the crane is adapted to change from the crane mode to the travel mode at a predetermined ground speed of the crane.

2. A pick and carry crane as claimed in claim 1, wherein the first rear axle is arranged closer to a rear of the rear body than the second rear axle.

3. A pick and carry crane as claimed in claim 1, wherein each of the first and second rear axles comprises a respective suspension system, and wherein the suspension system for the first rear axle is arranged to displace the first rear axle to cause its wheels to selectively engage or disengage with the ground.

4. A pick and carry crane as claimed in claim 1, further comprising a respective suspension system for the front axle, wherein the front axle suspension system is arranged to allow for a frame of the front body to rest on and transfer load directly to the front axle during a crane mode.

5. A pick and carry crane as claimed in claim 1, wherein the crane is configured to have a maximum rated capacity of at least 35 tonnes.

6. A pick and carry crane as claimed in claim 1, wherein the crane is configured to have a maximum rated capacity of at least 40 tonnes.

7. A pick and carry crane as claimed in claim 1, wherein the front body is pivotally connected to the rear body to define the crane as an articulated pick and carry crane, and wherein wheels for the crane each comprise rubber tyres.

8. A pick and carry crane, the crane comprising:
a front body that defines a front part of the crane, the front body pivotally connected via a pivot arrangement to a rear body of the crane;
the front body comprising a front axle for supporting the front body on the ground; the rear body comprising first and second rear axles, each for supporting the rear body on the ground, each of the first and second rear axles supporting at least a pair of opposing wheels; and
steering for at least one set of rear wheels;
wherein the first rear axle is arranged to be displaced relative to the second rear axle such that wheels of the first rear axle selectively engage or disengage with the ground.

9. The pick and carry crane according to claim 8 wherein the steering is for a rearmost set of wheels.

10. A method of operating a pick and carry crane having a front body that defines a front part of the crane, the front body pivotally connected via a pivot arrangement to a rear body of the crane, the rear body comprising first and second rear axles, each for supporting the rear body on the ground, each of the first and second rear axles supporting at least a pair of opposing wheels, the method comprising:
displacing the first rear axle relative to the second rear axle to engage or disengage wheels of the first rear axle with the ground, wherein the wheels of the first rear axle are engaged with the ground when the crane is operated in a travel mode, and the wheels of the first rear axle are disengaged with the ground when the crane is operated in a crane mode; and
changing from the crane mode to the travel mode at a predetermined ground speed of the crane.

11. A pick and carry crane comprising a front body that defines a front part of the crane, the front body pivotally connected via a pivot arrangement to a rear body of the crane, the rear body comprising first and second rear axles, each for supporting the rear body on the ground, each of the first and second rear axles supporting at least a pair of opposing wheels, wherein the first rear axle of the pick and carry crane is operated using the method as claimed in claim 10.

12. A method as claimed in claim 10, wherein an effective wheelbase of the crane is altered when the wheels of the first rear axle selectively engage or disengage with the ground.

13. A pick and carry crane, the crane comprising:
a front body that defines a front part of the crane, the front body pivotally connected via a pivot arrangement to a rear body of the crane;
the front body comprising a front axle for supporting the front body on the ground; the rear body comprising first and second rear axles, each for supporting the rear body on the ground, each of the first and second rear axles supporting at least a pair of opposing wheels;
wherein the first rear axle is arranged to be displaced relative to the second rear axle such that wheels of the first rear axle selectively engage or disengage with the ground; and
wherein an effective wheelbase of the crane is altered by selectively engaging or disengaging the wheels of the first rear axle with the ground.

14. A pick and carry crane, the crane comprising:
a front body that defines a front part of the crane, the front body pivotally connected via a pivot arrangement to a rear body of the crane;
the front body comprising a front axle for supporting the front body on the ground; the rear body comprising first and second rear axles, each for supporting the rear body on the ground;
wherein the first rear axle is arranged to be displaced relative to the second rear axle such that wheels of the first rear axle selectively engage or disengage with the ground;
wherein the crane is adapted to operate in a travel mode in which the wheels of the first rear axle selectively engage the ground, and a crane mode in which the wheels of the first rear axle selectively disengage the ground; and
wherein the crane is adapted to change from the crane mode to the travel mode at a predetermined ground speed of the crane.

* * * * *